United States Patent
Taylor et al.

(10) Patent No.: US 11,220,300 B2
(45) Date of Patent: Jan. 11, 2022

(54) ATTACHMENT METHOD FOR AN AUTOMOTIVE VEHICLE PANEL

(71) Applicant: GM GLOBAL TECHNOLOGY OPERATIONS LLC, Detroit, MI (US)

(72) Inventors: John D. Taylor, Royal Oak, MI (US); Matthew Simonin, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 15/931,085

(22) Filed: May 13, 2020

(65) Prior Publication Data
US 2021/0354765 A1 Nov. 18, 2021

(51) Int. Cl.
*B62D 33/02* (2006.01)
*B60R 13/01* (2006.01)
*F16B 37/06* (2006.01)

(52) U.S. Cl.
CPC .............. *B62D 33/02* (2013.01); *B60R 13/01* (2013.01); *B60R 2013/018* (2013.01); *F16B 37/061* (2013.01)

(58) Field of Classification Search
CPC ............... B62D 33/02; B62D 25/2054; B62D 25/2063; B62D 25/2072; B62D 25/209; B60R 13/01; B60R 2013/016; B60R 2013/018
USPC ...................................................... 296/39.1
See application file for complete search history.

(56) References Cited

U.S. PATENT DOCUMENTS

| 4,916,880 | A  | * | 4/1990  | Westerman, Jr. | ....... B29C 73/04  156/94 |
| 5,511,848 | A  | * | 4/1996  | Mobley         | .............. B62D 25/2054  280/795 |
| 5,992,915 | A  | * | 11/1999 | Thompson       | .............. B60R 13/01  296/39.2 |
| 6,149,749 | A  | * | 11/2000 | McBroom        | ............... B29C 73/02  156/87 |
| 9,180,745 | B1 | * | 11/2015 | Courtright     | ......... B62D 25/2054 |
| 9,783,245 | B1 | * | 10/2017 | Marchlewski    | ....... B62D 27/026 |
| 9,828,045 | B1 | * | 11/2017 | Harris         | .................. B62D 43/002 |
| 2004/0090077 | A1 | * | 5/2004 | Montagna       | ............... B60R 13/01  296/39.2 |
| 2005/0276950 | A1 | * | 12/2005 | Marquette     | .............. B62D 29/00  428/156 |
| 2006/0158001 | A1 | * | 7/2006 | Emch           | ..................... B29C 73/02  296/39.1 |
| 2008/0211252 | A1 | * | 9/2008 | Emch           | ..................... B60R 13/01  296/39.2 |
| 2009/0173857 | A1 | * | 7/2009 | Gronvall       | ................ B02C 17/22  248/226.11 |
| 2014/0147617 | A1 | * | 5/2014 | Preisler       | .................... B32B 7/08  428/99 |

(Continued)

Primary Examiner — Gregory A Blankenship
(74) Attorney, Agent, or Firm — Bonnie Shaw

(57) ABSTRACT

A method of assembling an automotive vehicle includes providing a panel having an upper surface and a lower surface. The method also includes providing a hole extending from the upper surface through the lower surface. The method additionally includes providing a patch at the upper surface, with the patch extending about a periphery of the hole at the upper surface and having a different material composition from the panel. The method also includes adhering a liner material to the upper surface, with the liner material being superposed over and adhered to the patch.

13 Claims, 2 Drawing Sheets

(56) References Cited

U.S. PATENT DOCUMENTS

| | | | | |
|---|---|---|---|---|
| 2015/0274060 A1* | 10/2015 | Welch | ............... | B62D 25/2054 |
| | | | | 296/184.1 |
| 2015/0274229 A1* | 10/2015 | Wilson | .................. | B62D 65/02 |
| | | | | 296/191 |
| 2015/0375807 A1* | 12/2015 | Courtright | ............ | B62D 65/02 |
| | | | | 296/184.1 |
| 2017/0233016 A1* | 8/2017 | Courtright | .......... | B62D 33/077 |
| | | | | 296/183.1 |

* cited by examiner

ATTACHMENT METHOD FOR AN AUTOMOTIVE VEHICLE PANEL

INTRODUCTION

The present disclosure relates generally to methods of assembly, and more particularly to methods of assembling accessories to automotive vehicle panels.

Pick-ups and utility vehicles are often provided with a bed or cargo bay for transporting cargo. A variety of accessories are available for utilizing the cargo space. For example, bed dividers can be purchased as an after-market item. Other storage and organization items such as ladder racks and bicycle racks are also commercially available. Moreover, it may be desirable to secure some items such as toolboxes or generators to vehicle. Such accessories must be secured to the vehicle for transport, and are generally secured to the bed.

SUMMARY

A method of assembling an automotive vehicle according to the present disclosure includes providing a panel having an upper surface and a lower surface. The method also includes providing a hole extending from the upper surface through the lower surface. The method additionally includes providing a patch at the upper surface, with the patch extending about a periphery of the hole at the upper surface and having a different material composition from the panel. The method also includes adhering a liner material to the upper surface, with the liner material being superposed over and adhered to the patch.

In an exemplary embodiment, the patch includes a polyester film tape. The method where the liner material includes an elastomer.

In an exemplary embodiment, adhering a liner material includes spraying the liner material on the upper surface and curing the liner material.

In an exemplary embodiment, the panel includes a sheet metal.

In an exemplary embodiment, the method additionally includes providing a template having one or more indicators corresponding to the position of the hole.

In an exemplary embodiment, the method additionally includes securing a fastener to the lower surface, with the fastener being aligned with the hole. The fastener may be a weld nut.

In an exemplary embodiment, the method further includes removing the liner material and the patch from the hole, and fastening an accessory member to the hole.

A vehicle according to the present disclosure includes a panel having an upper surface, a lower surface, and a hole extending from the upper surface through the lower surface. The vehicle also includes a patch disposed on the upper surface, with the patch extending about a periphery of the hole at the upper surface and having a different material composition from the panel. The vehicle also includes a liner material adhered to the upper surface, with the liner material being superposed over and adhered to the patch.

In an exemplary embodiment, the patch has a second hole and the liner material has a third hole extending therethrough, with the third hole and second hole being aligned with the hole. In such embodiments, the vehicle further includes an accessory disposed proximate the panel and a fastener coupling the accessory to the panel via the hole, second hole, and third hole.

In an exemplary embodiment, the vehicle further includes a fastener secured to the lower surface, the fastener being aligned with the hole. The fastener may be a weld nut.

Embodiments according to the present disclosure provide a number of advantages. For example, the present disclosure provides a method of assembly wherein accessory attachment points may be provided on a panel while satisfying various aesthetic and performance requirements.

The above advantage and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Figure 1:
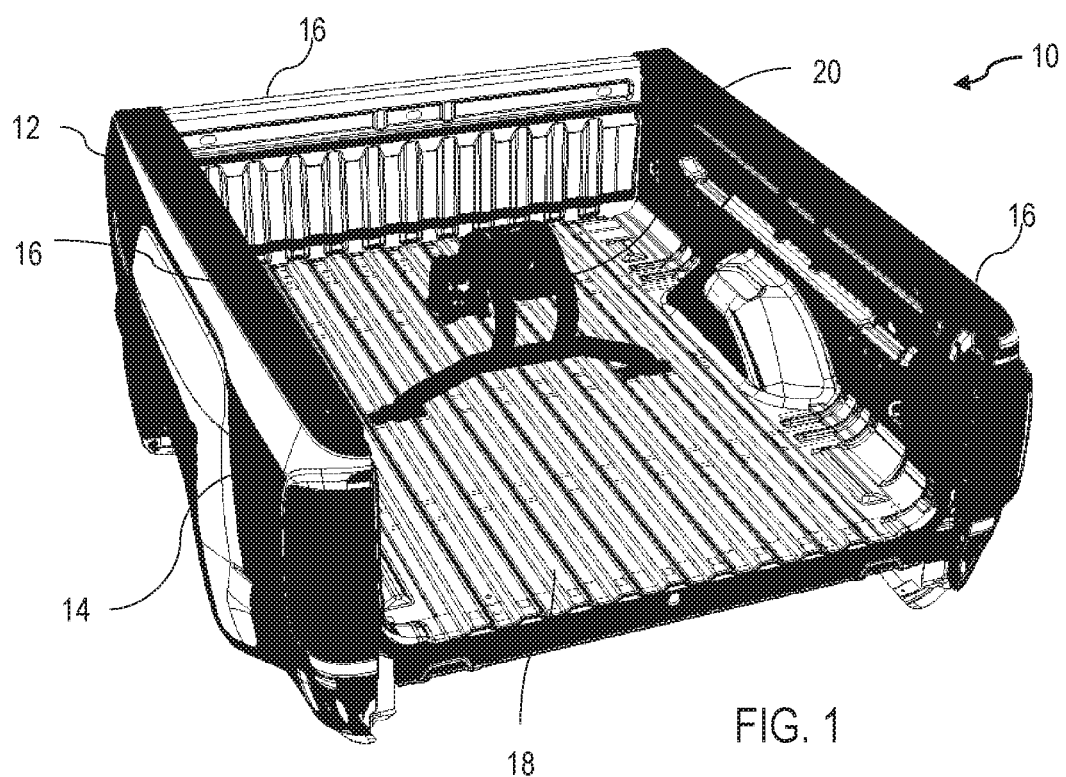
FIG. 1 is a schematic representation of an automotive vehicle according to an embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring now to FIG. 1, a vehicle assembly 10 is shown. The vehicle assembly 10 includes an automotive vehicle 12 having a cargo bay 14, which may alternatively be referred to as a bed or tonneau, for transporting cargo. The cargo bay 14 is bounded by a plurality of sidewalls 16 and a floor panel 18. An endgate (not shown in FIG. 1) may be pivotably coupled to the cargo bay 14 to selectively provide access to the cargo bay 14 from the exterior of the vehicle 12. An accessory 20 is disposed in the cargo bay 14 and secured to the floor panel 18, as will be described in further detail below with respect to FIGS. 2 and 3.

Conventionally, cargo areas in vehicles include a sheet metal base upon which a liner material is deposited. However, this arrangement presents various challenges with respect to the attachment of accessories. If a consumer drills through the liner material and sheet metal to secure an accessory, the consumer may adversely impact the corrosion resistance of the sheet metal. Alternatively, a manufacturer may provide pre-drilled holes through the liner and sheet metal to which accessories may be secured. However, such holes may adversely impact the aesthetic qualities of the vehicle if not needed, and moreover may permit intrusion of debris.

Figure 2:
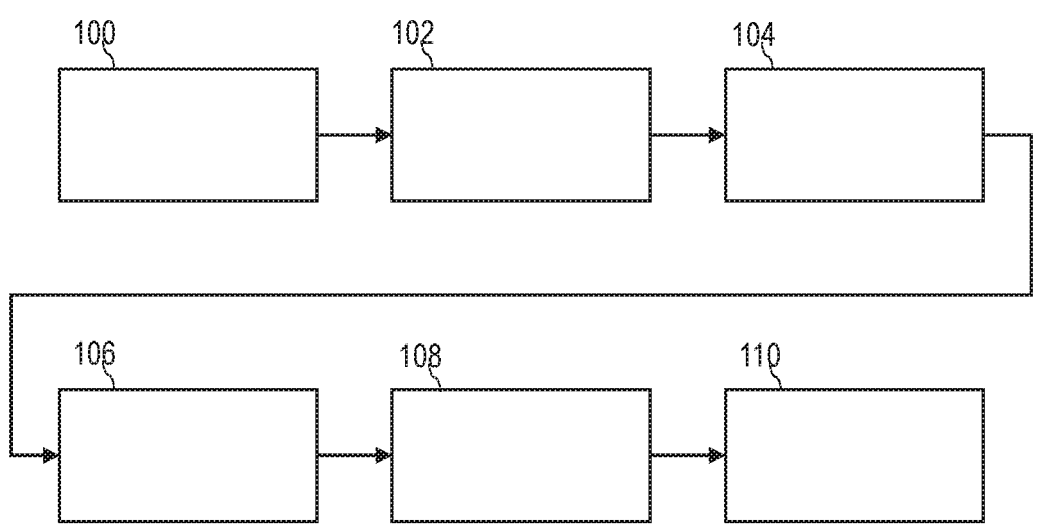
FIG. 2 is a flowchart representation of a method of assembly according to an embodiment of the present disclosure.

Referring now to FIGS. 2 and 3, assembly according to the present disclosure is illustrated schematically. While the assembly will be described with respect to the floor panel 18, one of ordinary skill in the art will appreciate that the assembly may be performed with any suitable panel, e.g. one of the sidewalls 16, other panels of the vehicle 12, or indeed with non-automotive panels.

Figure 3A:
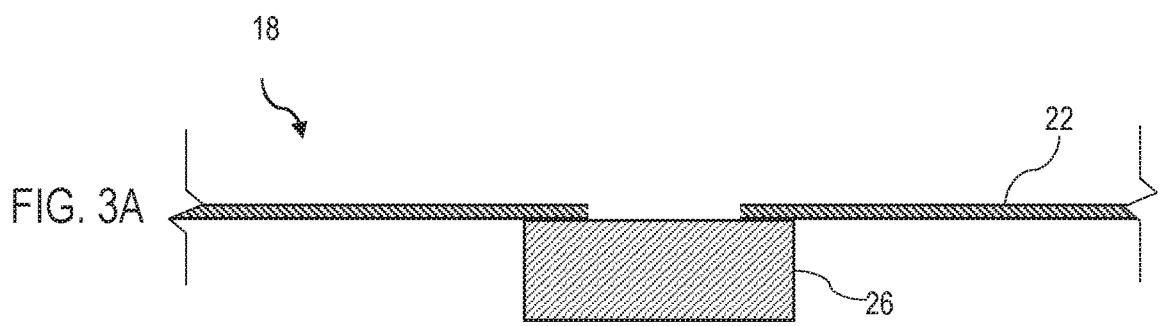
FIGS. 3A, 3B, 3C, and 3D are a schematic representation of assembly according to an embodiment of the present disclosure.
Figure 3B:
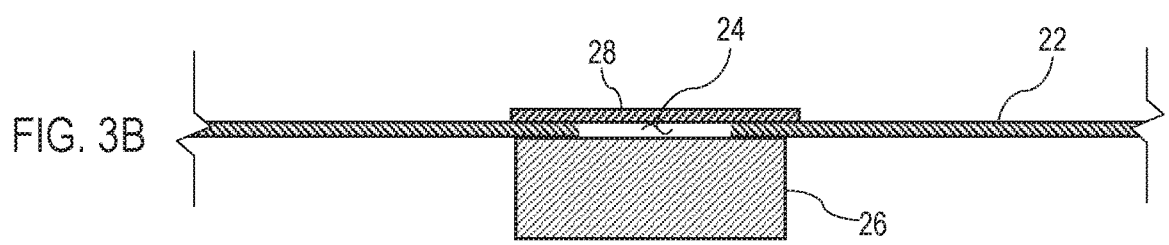

Assembly of the floor panel 18 begins with providing a panel having a hole therethrough, as illustrated at block 100. As may be seen in FIG. 3a, the panel 22 is a generally planar body with a hole 24 extending through the entirety of the panel 22. While only one hole 24 is depicted in FIG. 3a, in various embodiments a plurality of holes 24 may be provided. In an exemplary embodiment the panel 22 comprises sheet metal, e.g. steel, having a thickness between 0.75 and 0.85 inches. However, in other embodiments the panel 22 may comprise other metallic or nonmetallic materials. The hole 24 may be provided via stamping, piercing, or any other suitable method of providing a hole in the panel 22. In the embodiment illustrated in FIG. 3a, a first fastener 26 is coupled to a lower surface of the panel 22. Such an embodiment may be advantageous when the hole 24 is provided in a location where access to the lower surface of the panel 22 will be inhibited. The first fastener 26 may be a nut welded to a lower surface of the panel 22, or any other suitable fastener connected to the lower surface of the panel 22. However, in other embodiments the first fastener 26 may be provided at a later step of assembly, as will be discussed in further detail below.

A patch is provided over the hole, as illustrated at block 102. As may be seen in FIG. 3b, the patch 28 is coupled to the panel 22, e.g. via adhesive, and extends about the periphery of the hole 24. In an exemplary embodiment, the patch 28 comprises a polyester film tape, e.g. Mylar® tape, or other film tape having an adhesive lower surface. In other embodiments, the patch 28 may be formed of any suitable material to which liner material discussed below can adhere.

A liner material is then applied over the patch and the panel, as illustrated at block 104. In an exemplary embodiment, the liner material comprises a polymer, e.g. an elastomer such as polyurea. The liner material may be applied by any suitable means, e.g. as a sprayable or roll-on material which may be subsequently cured. As may be seen in FIG. 3c, the liner material 30 extends across an upper surface of the panel 22 and patch 28. In an exemplary embodiment, the liner material 30 has a thickness between 3 and 4 mils. The liner material 30 may optionally be locally thickened in the vicinity of the patch 28, e.g. to between 4 and 6 mils. In embodiments wherein the liner material 30 is applied via spray, the local thickening may be accomplished by slowing movement of the sprayer in the vicinity of the patch 28, thereby applying additional liner material 30.

Figure 3C:
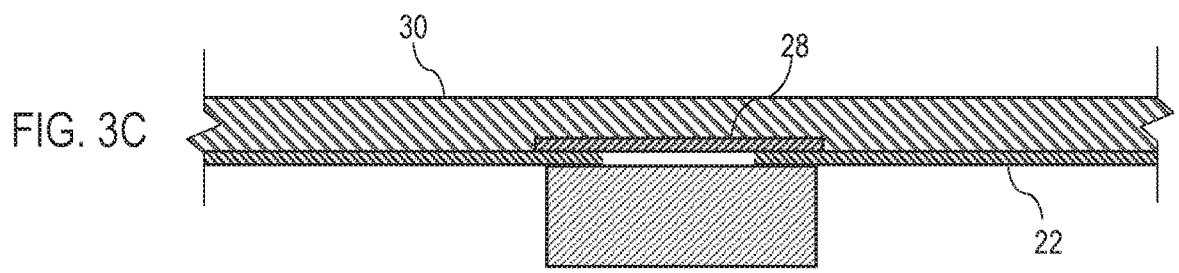
Figure 3D:
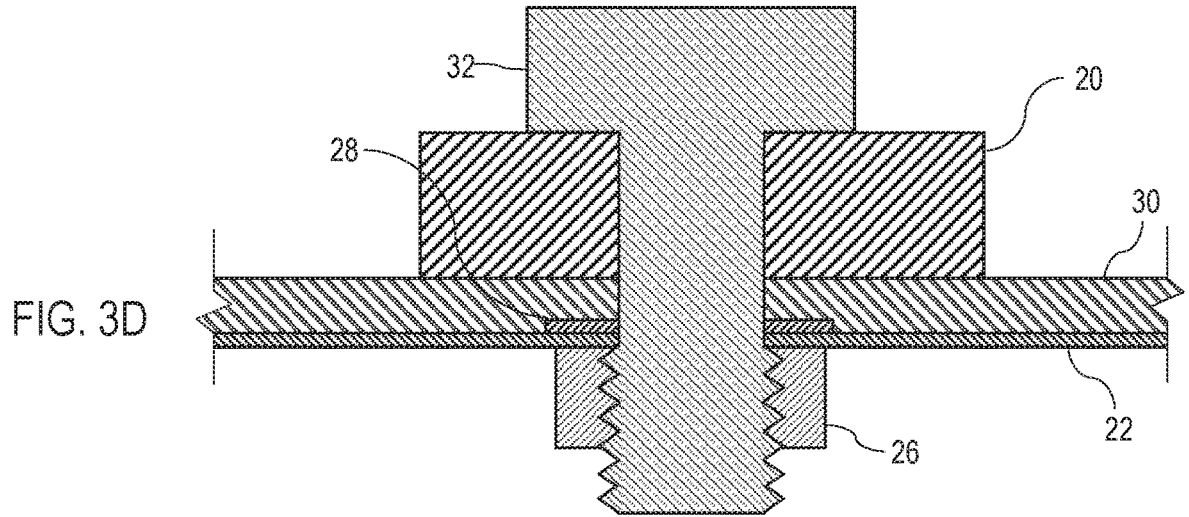

As may be seen in FIG. 3c, after application of the liner material 30, the floor panel 18 has a contiguous upper surface with no visible holes. However, the underlying panel 22 is provided with the hole 24 for subsequent attachment of accessories.

When a consumer or retailer desires to install an accessory via fastening to the floor panel 18, the liner material 30 and patch 28 are removed over the hole 24, as illustrated at block 106. This may be performed via piercing, drilling, cutting, or any other suitable method. To facilitate removal of the liner material 30 at the proper location, a template may be provided indicating the location of the hole(s) 24 under the liner material 30. Alternatively, the liner material 30 itself may be provided with guide marks such as scoring or other indicators to signal the location of the hole(s) 24.

The accessory 20 is then positioned in a desired location proximate the hole 24, as illustrated at block 108. The accessory is subsequently fastened to the panel 18 via the hole 24, as illustrated at block 110 and in FIG. 3d. In the embodiment illustrated in FIG. 3d, a second fastener 32, e.g. a bolt, is inserted into a hole in the accessory 20, through the hole 24, and coupled to the first fastener 26. In other embodiment, e.g. those having easy access to the underside of the panel 22, first fastener 26 may be provided separately rather than welded to the panel 22. Alternatively, in some embodiments other fastener configurations may be used such as screws, pegs, clips, or other fasteners.

As may be seen, the present disclosure provides method of assembly wherein accessory attachment points may be provided on a panel while satisfying various aesthetic and performance requirements.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of assembling an automotive vehicle comprising:
   providing a panel having an upper surface and a lower surface;
   providing a hole extending from the upper surface through the lower surface;
   providing a patch at the upper surface, the patch extending about a periphery of the hole at the upper surface and having a different material composition from the panel; and adhering a liner material to the upper surface, the liner material being superposed over and adhered to the patch.

2. The method of claim 1, wherein the patch comprises a polyester film tape.

3. The method of claim 1, wherein the liner material comprises an elastomer.

4. The method of claim 1, wherein adhering a liner material comprises spraying the liner material on the upper surface and curing the liner material.

5. The method of claim 1, wherein the panel comprises a sheet metal.

6. The method of claim 1, further comprising providing a template having one or more indicators corresponding to the position of the hole.

7. The method of claim 1, further comprising securing a fastener to the lower surface, the fastener being aligned with the hole.

8. The method of claim 7, wherein the fastener is a weld nut.

9. The method of claim 1, further comprising:
removing the liner material and the patch from the hole; and
fastening an accessory member to the hole.

10. A vehicle comprising:
a panel having an upper surface, a lower surface, and a hole extending from the upper surface through the lower surface;
a patch disposed on the upper surface, the patch extending about a periphery of the hole at the upper surface and having a different material composition from the panel; and
a liner material adhered to the upper surface, the liner material being superposed over and adhered to the patch.

11. The vehicle of claim 10, wherein the patch has a second hole and the liner material has a third hole extending therethrough, the third hole and second hole being aligned with the hole, the vehicle further comprising an accessory disposed proximate the panel and a fastener coupling the accessory to the panel via the hole, second hole, and third hole.

12. The vehicle of claim 10, further comprising a fastener secured to the lower surface, the fastener being aligned with the hole.

13. The vehicle of claim 12, wherein the fastener is a weld nut.

* * * * *